April 8, 1941.  A. C. CHRISTENSEN ET AL  2,237,957
AGITATOR MULLER
Original Filed June 22. 1939   3 Sheets-Sheet 1

Inventors
ALFRED C. CHRISTENSEN,
BY BARNEY CASTOR,
Attorneys

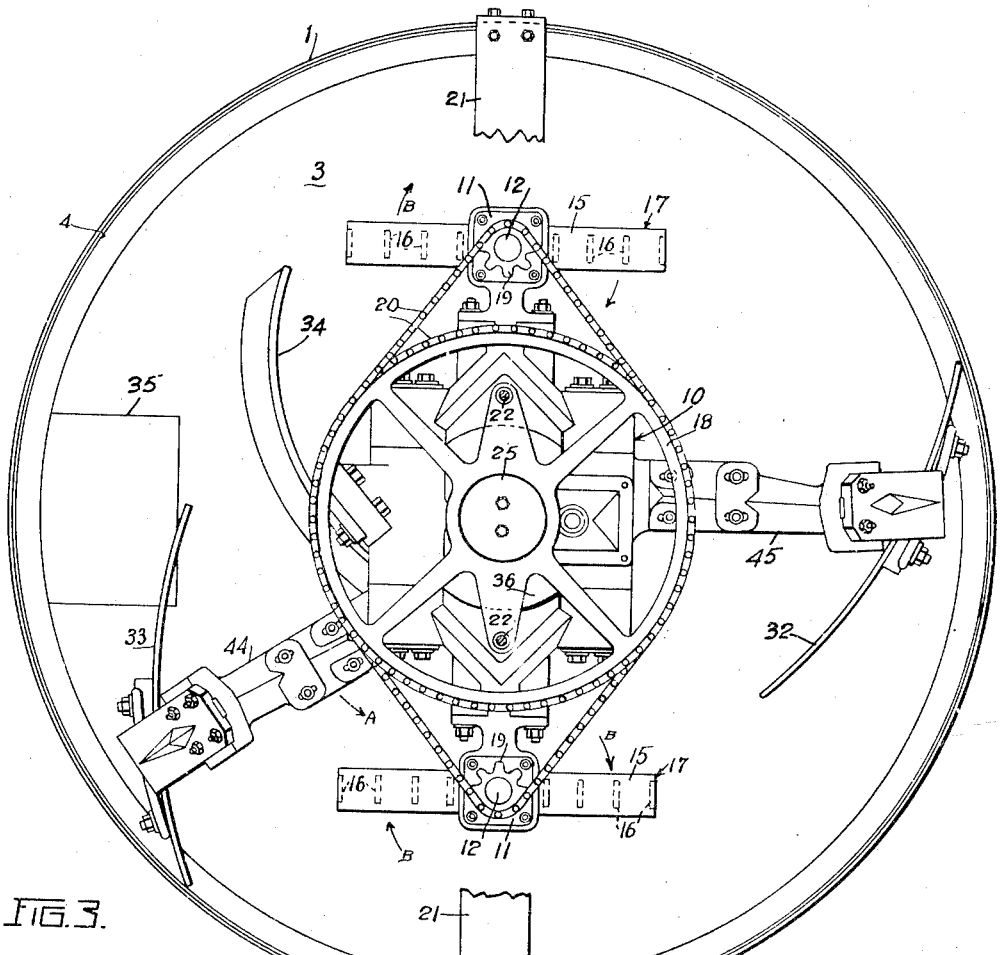
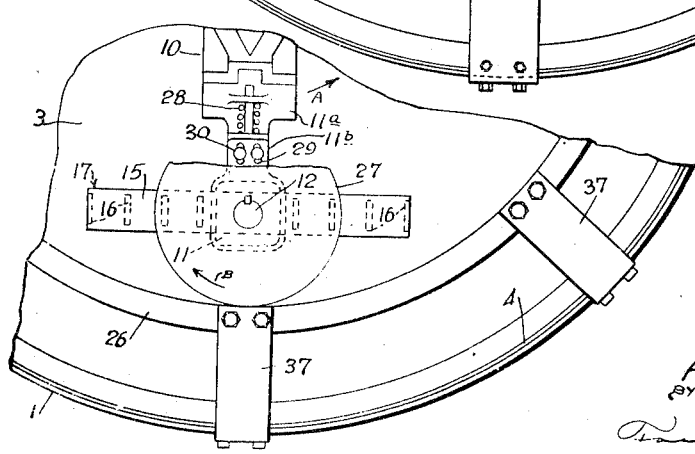

April 8, 1941.   A. C. CHRISTENSEN ET AL   2,237,957
AGITATOR MULLER
Original Filed June 22, 1939   3 Sheets-Sheet 3
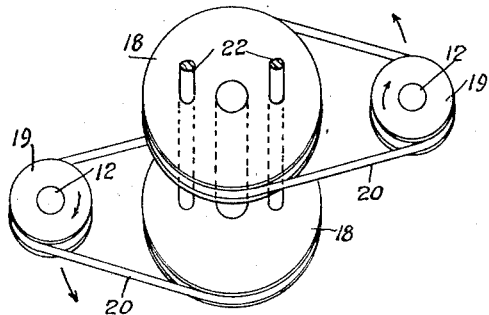
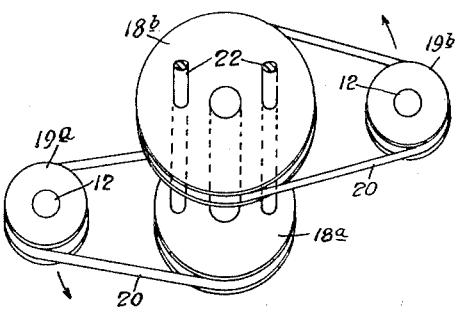
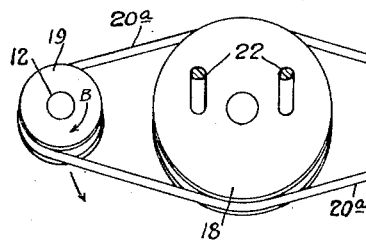
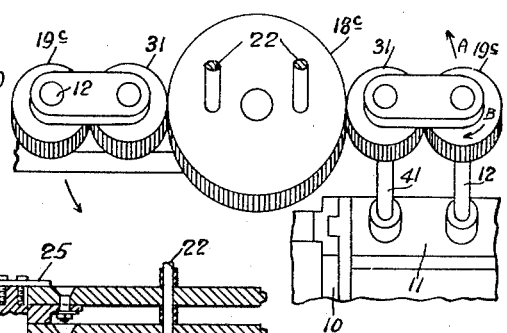
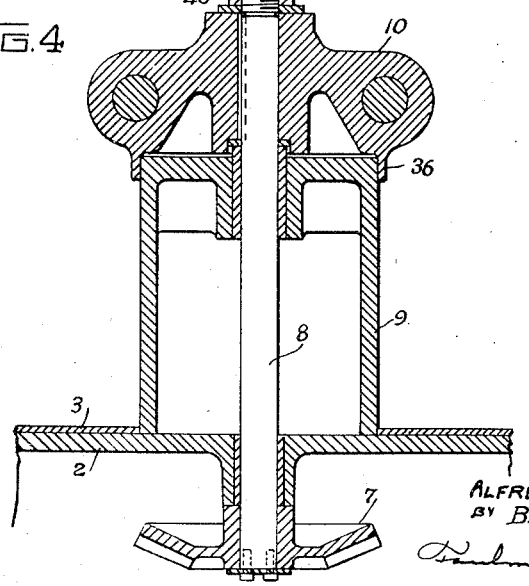
Inventors
ALFRED C. CHRISTENSEN,
BY BARNEY CASTOR.
Attorneys Patented Apr. 8, 1941

2,237,957

UNITED STATES PATENT OFFICE 2,237,957

AGITATOR MULLER

Alfred C. Christensen and Barney Castor, Chicago, Ill., assignor to Herbert S. Simpson, Chicago, Ill.

Original application June 22, 1939, Serial No. 280,605. Divided and this application September 28, 1939, Serial No. 296,970

1 Claim. (Cl. 259—102)

This invention relates to a mixer which is particularly adapted to be used in the intensive mixing of two or more materials with one another. The device of the present invention is adapted to be used in the chemical field generally and wherever a plurality of ingredients, some of which are solid, are to be intensively admixed with one another. It is especially useful for mixing dry or semi-plastic materials, such as used in the ceramic industry and elsewhere.

The principal object of the present invention is to provide an intensive mixer wherein the mixing is accomplished by one or more mixing blades which move in an orbital path about the center of the mixing device, and, at the same time, are positively rotated in their orbital path.

Another object is to provide a mixer of the foregoing type wherein the mixing blades are rotated in their orbital path in such a direction that maximum efficiency of mixing is attained.

Still another object is to provide a mixer of the foregoing type which utilizes the pan and driving means of a wheel type muller and which is, therefore, adapted to be manufactured by the application of the features of the present invention to existing type mullers.

Another object is to provide a mixer of the type referred to above wherein the rotation of the mixing blades, as they are revolved in their orbital path about the center of the mixing pan, is effected by positive driving means; in the preferred embodiment, this driving means comprises a stationary circular member disposed with its driving edge concentric with the orbital path of the mixing blades, and means for rotatably driving the mixing blades, as they are revolved in their orbital path, from this stationary driving member.

Yet another object is to provide driving means for the mixing blades which comprises a stationary sprocket concentric with the mixing pan, a driven sprocket on the axis of and connected with the shaft of the mixing blade, and a sprocket chain encircling the stationary sprocket and the driven sprocket whereby the revolution of the blade causes it to be driven rotatably and positively by the sprocket chain.

Still another object is to provide driving means for rotating the mixing blade a plurality of times for each revolution thereof about the center of the device; in this way, the intensity of the mixing is greatly enhanced.

Yet another object is to provide in a mixer of the foregoing type one or more scrapers which engage the sides of the muller pan and throw scraped material inwardly into the path of the mixing blades.

Still another object is to provide one or more plows which engage a central stationary turret located at the center of the mixing pan and which are adapted to throw scraped material outwardly into the path of the mixing blades.

While the invention will be described as employing a plurality of orbitally revolved mixing blades, it will be understood that only one such mixing blade may be employed although this will considerably reduce the speed of the mixing.

This application is a division of my application Serial No. 280,605, filed June 22, 1939.

Referring to the accompanying drawings:

Figure 2 is a plan view of the device of Figure 1, with the cross member which holds the central gear stationary broken away, so as to more clearly illustrate the remaining parts.

Figure 3 is a plan view showing a modified form of drive for the agitating blades.

Figure 4 is a vertical section taken through the turret and driving mechanism of the modification shown in Figures 1 and 2.

Figure 5 is a schematic view of the drive of Figures 1 and 2.

Figure 6 is a schematic view of a modified form of construction.

Figure 7 is a schematic view of a still further modified construction, wherein the agitating blades are rotated at different speeds.

Figure 8 is a schematic view of a still further modification, in which friction gears or spur gears are utilized instead of a sprocket chain or friction belt, to drive the agitating blades.

Figure 1:
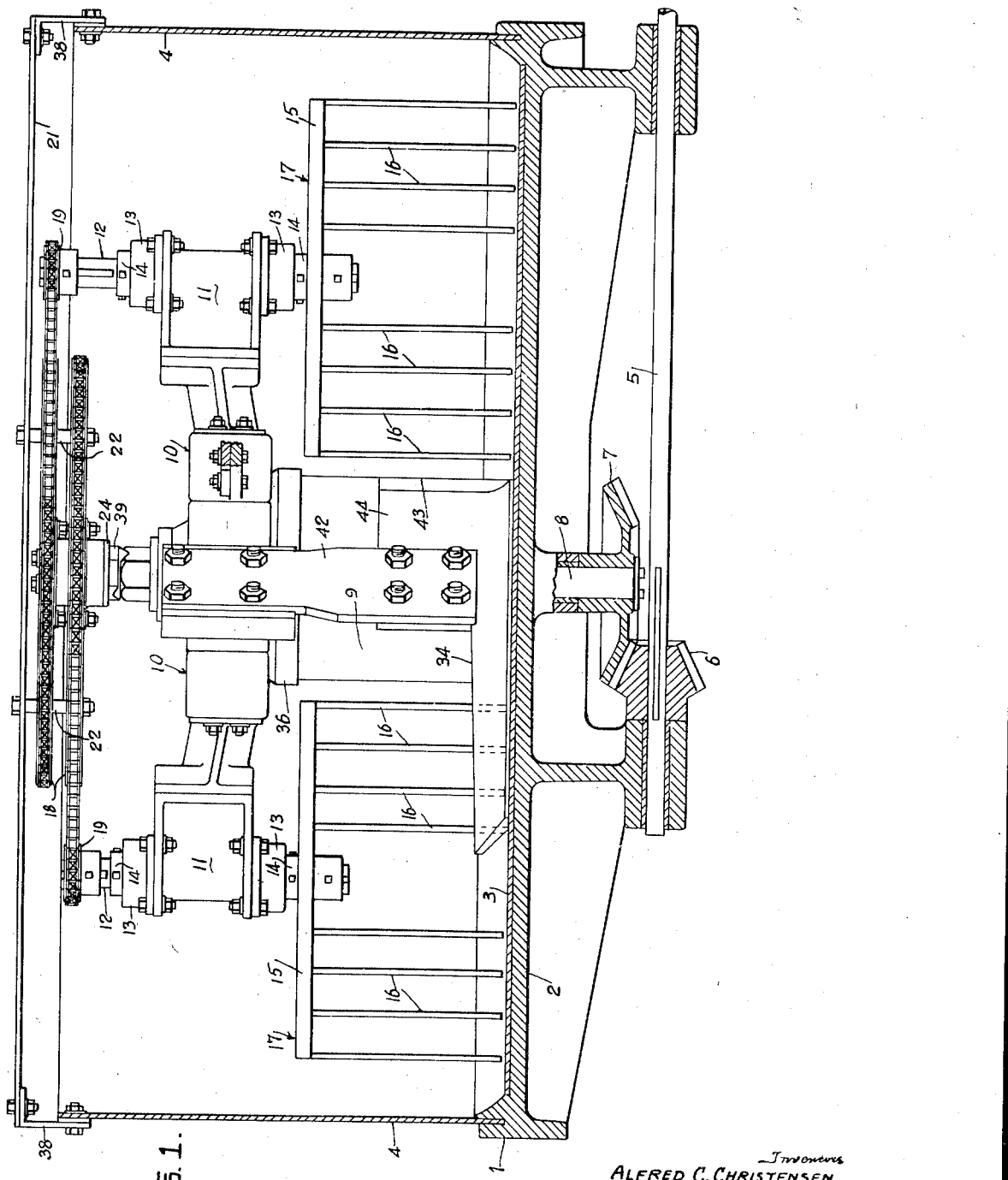
Figure 1 is a vertical sectional view of an intensive mixer of the present invention, with the agitator blades, the turret plow and the blade revolving and blade rotating mechanisms in elevation.

Referring to the drawings in detail, reference numeral 1 designates generally a muller pan having a supporting casting 2 which is lined with a wear-resisting pan bottom 3, and is provided at its edge with a circular pan wall 4. A main drive shaft 5 is supported beneath the muller pan 1 and drives through enmeshing gears 6 and 7. Gear 7 is keyed to a vertical shaft 8 which extends upwardly through casting 2 and which is located in the center of the muller pan 1. Shaft 8 extends up through a turret 9 and is keyed above turret 9 to the revolving cross head designated generally as 10.

Cross head 10 carries at its opposite ends blade supporting castings 11 which are detachably secured thereto. These castings 11 are provided with rotatable vertical blade-carrying shafts 12 which are journaled in journals 13 mounted on castings 11. Any suitable means is provided to prevent vertical displacement of rotating shafts 12, as for example, suitable thrust bearings in journals 13 or collars 14 fixedly mounted upon shaft 12 exteriorly of journals 13. Shafts 12 carry the agitating blades assembly, designated generally as 17, which comprises a cross member 15 and, depending therefrom, a plurality of spaced blades 16. As indicated in the drawings, these blades are preferably spaced away from the center of shaft 12 and symmetrically at equal distances therefrom, although obviously any desired spacing of blades 16 along member 15 may be employed. Blades 16 may be unsymmetrically and unevenly disposed if desired. Preferably these blades 16 extend downwardly to a point where they almost but do not quite touch the upper surface of wear plate 3, as is clearly indicated in Figure 1. If desired, suitable means (not shown) may be provided for adjusting the tips of the blades 16 vertically with respect to plate 3.

As a result of the construction thus far described, as drive shaft 5 is rotated, vertical shaft 8 is similarly rotated together with accompanying cross head 10. Consequently, blade-carrying shaft 12 and the blade assembly 17 carried thereby revolve in a circular orbit about the center of the mixing pan.

Means is provided for causing rotation of the blade assembly 17 about its own axis as it is revolved about the center of the mixing pan. This means may comprise a stationary sprocket 18 for each of the shafts 12. Shafts 12 have fixedly attached to their upper ends relatively small sprockets 19 which mesh with a sprocket chain 20 which encircles and meshes with relatively large sprocket 18.

Any suitable means is provided for holding central sprockets 18 stationary as blade assemblies 17 are revolved in their orbital paths. In the form of the invention shown in Figures 1, 2 and 4, this means comprises a cross member 21 fixedly attached to and supported by supports 38 attached to the upper portion of the wall 4. Cross member 21 has its central axis on a diameter of the mixing pan. Bolts 22 extend downwardly from cross member 21 through sprockets 18, thereby holding said sprockets stationary. Sprockets 18 are journaled freely about an extension 23 which extends upwardly from shaft 8 and is integral therewith. Thus, shaft 8 and extension 23 are free to rotate relative to stationary sprockets 18. A thrust washer 24 rotatably supports the weight of sprockets 18 upon a nut 39 which is tightly locked upon the upper threaded portion 40 of shaft 8. A sealing washer 25 is fixedly mounted on the upper end of extension 23 and keeps material being mixed or being supplied to the mixer from access to the bearing of sprockets 18 on extension 23 or upon thrust washer 24.

In the modified form of drive shown in Figure 3, a concentric circular friction driving rim 26 is stationarily supported by and inwardly of wall 4 of the mixing pan by supports 37 which are fixedly mounted adjacent the upper rim of wall 4. A friction driving member 27 is keyed to blade-carrying shaft 12 and frictionally engages driving rim 26 so that as blade-carrying shaft 12 is revolved about the center of the mixing pan, friction gear 27 causes rotation of shaft 12 in the desired direction and at the desired speed. In this modification, preferably resilient means such as spring 28 is interposed between cross head 10 and friction gear 27 so as to yieldingly urge friction gear 27 into driving engagement with driving track 26. In order to accomplish this, the blade supporting casting may be made into two parts, 11a and 11b, casting 11b being slidably mounted relative to casting 11a by means of slots 29 provided therein cooperating with pins 30 fixedly mounted in casting 11a and spring 28 being so disposed that it urges casting 11b outwardly with respect to casting 11a and cross head 10.

Instead of using a friction gear and driving rim in the modification of Figure 3, gear 27 might be a toothed gear cooperating with a toothed circular stationary rack.

As indicated, blade-carrying shaft 12 is rotated more than once per revolution of driving shaft 8 and cross head 10. This is accomplished by having sprocket 19 formed with fewer teeth than sprocket 18. In a preferred form, shaft 12 will rotate 4 or more times per revolution of cross head 10. In the modification of Figure 3, a similar ratio is provided. In Figures 5 to 8, there are illustrated schematically, various methods of carrying out the inventive thought. Figure 5 illustrates schematically the form of the invention embodied in Figures 1, 2 and 4 wherein two separate stationary sprockets 18 drive two separate planetary sprockets 19 by means of two separate sprocket chains 20.

In Figure 6, the result accomplished is the same as that of Figure 5 but with a simplification of the assembly, only one stationary sprocket 18 being employed, and a common sprocket chain 20a driving both planetary sprockets 19 at the same speed of rotating.

In Figure 7 differential rotation of the blade assemblies is obtained, stationary sprocket 18a being of smaller diameter than sprocket 18b whereby planetary sprocket 19a is driven at lower speed than sprocket 19b, so that the blade assembly driven by sprocket 19a rotates at a lower speed than that driven by sprocket 19b. It is to be understood that instead of using sprockets and sprocket chains in Figures 5 to 7, suitable friction pulleys and friction belt may be employed. Figures 5 to 7 have been purposely drawn to illustrate either friction or toothed driving means.

In Figure 8, an alternative form of construction is shown wherein a stationary sun gear 18c drives planetary gears 19c in the desired direction through the intermediary of idler gears 31. Idler gears 31 revolve with cross head 10 and therefore, with the blade-carrying assemblies. Gears 31 may be fixedly attached to a shaft 41 which is rotatably mounted on casting 11. The gears may be either friction gears or toothed gears, of any suitable type. Thus the blade assemblies are rotated at the same speed and in the same direction as in the modification shown in Figures 1 and 2.

Scrapers 32 and 33 carried by arms 45 fixedly attached to cross head 10 scrape the sides and outer bottom portion of muller pan 1, throwing the scraped material inwardly into the path of the revolving and rotating blade assemblies 17. A plow 34, mounted at the lower end of a vertical arm 42 mounted on cross head 10, revolves about turret 9 and scrapes the same by means of beveled edge 43 provided at the innermost portion of its enlarged end 44. Plow 34 also scrapes the inward bottom portion of muller pan 1 and throws the scraped material outwardly into the path of blade assemblies 17. The agitator assemblies 17 throw materials being mixed onto the outer periphery of the stationary muller pan 1, that is, onto the wall 4 and the outer peripheral portion of the bottom 3. The scraper 32 carries the material from the outer periphery of the muller pan in front of one of the agitator assemblies 17. Plow 34 creates an outward movement of the material, cooperating with scraper 32 to mix the material, and this mixing effect is greatly accentuated by the mixing assemblies 17 the path of which overlaps that of the delivery ends of scraper 32 and plow 34, and which rotate and revolve at relatively high speed. Scraper 33 scrapes material inwardly into the path of plow 34 which moves it slightly outwardly into the path of the other of the agitator assemblies 17. Although scraper 33 greatly increases the mixing efficiency of the machine, it may be omitted if desired. Since the leading portion of the agitator assemblies, which first encounters the material, moves outwardly towards the side wall, the agitators tend to throw more material outwardly than inwardly, the trailing portion of the agitator encountering what is left and throwing it inwardly toward the turret. Thus, a continued transfer of the material to and from the side wall from and to the mixing blades, and to and from the turret from and to the mixing blades is effected while mixing the material intensively by reason of the combined rotation and revolution of the agitators.

The cross head 10 and the blade-carrying shafts 12 are revolved in the direction indicated by the arrows A. At the same time, the blade assembly 17 is rotated in the direction indicated by the arrows B. The result is that the leading portions of the blade assembly 17 throw the material outwardly, while the trailing portions throw the material inwardly towards the turret 9. This has been found to give more efficient and more intensive mixing than would be obtained were the blade assemblies rotated in the opposite direction. However, it is to be understood that either direction of rotation is within the spirit of our invention in its broader aspect.

A door 35 is provided in the bottom of the muller pan 1. This door is normally mounted flush with the bottom of the muller pan so as to not interfere with the mixing and with the action of the scrapers and plow. Any suitable means (not shown) may be provided for opening this door downwardly to allow discharge of the mixed material through the opening thus formed.

As shown in Figures 1 and 4, the cross head 10 is provided with a downwardly extending skirt 36 which surrounds the upper portion of turret 9 and prevents material being mixed from obtaining access to the drive shaft 8 and its bearings.

Instead of revolving cross arm 10, carrying-blade assemblies 17 and scrapers 32 and 33 and plow 34 with respect to pan 1, the parts named may be held stationary and pan 1 rotated, thereby imparting the same relative orbital or revolving motion between the parts, and the same rotation of agitator assemblies 17 about their own axes. Or both pan 1 and cross head 10 and the parts carried thereby may be rotated with respect to each other although this may involve objectionable drive complications.

It is to be understood that we intend to include as within our invention such modifications as may be necessary to adapt the same to varying conditions and uses and as fall within the terms or the spirit of the appended claim.

Having thus fully described our invention, what we claim as new and desire to secure by Letters Patent is:

In a mixer, in combination, a mixing pan, a mixing assembly therein, means for causing said assembly to revolve in an orbital path in said pan, a friction gear mounted on said mixing assembly, a stationary driving rim concentric with said orbital path and located outwardly thereof, said friction gear frictionally engaging with said driving rim whereby said mixing assembly is rotated on its own axis as it is revolved in said orbital path, and means yieldingly urging said friction gear into engagement with said driving rim.

ALFRED C. CHRISTENSEN.
BARNEY CASTOR.